US012287924B2

(12) United States Patent
Zhuo

(10) Patent No.: US 12,287,924 B2
(45) Date of Patent: Apr. 29, 2025

(54) KEYBOARD INPUT METHOD AND SYSTEM, COMPUTER-READABLE STORAGE MEDIUM, ELECTRONIC DEVICE, AND COMPUTER PROGRAM PRODUCT

(71) Applicant: TENCENT TECHNOLOGY (SHENZHEN) COMPANY LIMITED, Guangdong (CN)

(72) Inventor: Xingzhong Zhuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/584,476

(22) Filed: Feb. 22, 2024

(65) Prior Publication Data

US 2024/0248547 A1 Jul. 25, 2024

Related U.S. Application Data

(63) Continuation of application No. PCT/CN2023/091151, filed on Apr. 27, 2023.

(30) Foreign Application Priority Data

Jul. 14, 2022 (CN) .......................... 202210834058.0

(51) Int. Cl.
*G06F 3/023* (2006.01)
*G06F 3/04886* (2022.01)

(52) U.S. Cl.
CPC .......... *G06F 3/023* (2013.01); *G06F 3/04886* (2013.01)

(58) Field of Classification Search
CPC .... G06F 3/023; G06F 3/04886; G06F 3/0237; G06F 3/0233; G06F 3/0236
See application file for complete search history.

(56) References Cited

U.S. PATENT DOCUMENTS

2009/0058823 A1* 3/2009 Kocienda ............ G06F 3/04895
345/173
2018/0039335 A1* 2/2018 Pasquero .............. G06F 3/0237

FOREIGN PATENT DOCUMENTS

CN 101491127 A 7/2009
CN 101821708 A 9/2010
(Continued)

OTHER PUBLICATIONS

International Search Report for PCT/CN2023/091151, dated Jul. 1, 2023.

*Primary Examiner* — Abhishek Sarma
(74) *Attorney, Agent, or Firm* — Sughrue Mion, PLLC

(57) ABSTRACT

A keyboard input method and system, the method including obtaining inputted information of a current input keyboard, and determining a first type of the current input keyboard based on the inputted information, loading, based on the first type being inconsistent with a second type of a previous input keyboard used during a previously performed input operation, a system word vocabulary and a conversion algorithm model that correspond to the first type from a library, obtaining user entry information corresponding to the inputted information from a user lexicon that has been loaded, obtaining system entry information corresponding to the inputted information from the system word vocabulary, and determining a list of to-be-selected entries corresponding to the inputted information according to the user entry information, the system entry information, and the conversion algorithm model, and outputting the list of to-be-selected entries.

20 Claims, 7 Drawing Sheets

(56) References Cited

FOREIGN PATENT DOCUMENTS

| CN | 105872817 | A | 8/2016 |
| CN | 106406564 | A | 2/2017 |
| CN | 114296561 | A | 4/2022 |

\* cited by examiner

KEYBOARD INPUT METHOD AND SYSTEM, COMPUTER-READABLE STORAGE MEDIUM, ELECTRONIC DEVICE, AND COMPUTER PROGRAM PRODUCT

CROSS-REFERENCE TO RELATED APPLICATIONS

This application is a continuation application of International Application No. PCT/CN2023/091151 filed on Apr. 27, 2023, which claims priority to Chinese Patent Application No. 202210834058.0 filed with the China National Intellectual Property Administration on Jul. 14, 2022, the disclosures of each being incorporated by reference herein in their entireties.

FIELD

The disclosure relates to the field of information processing technologies, and in particular, to a keyboard input method and system, a computer-readable storage medium, an electronic device, and a computer program product.

BACKGROUND

Many electronic devices can be equipped with dual keyboards, that is, a physical keyboard and a virtual keyboard. The physical keyboard is an instruction and data input apparatus configured for operating running of the electronic device, and the virtual keyboard is a virtual key keyboard on a touchscreen of the electronic device. A user may directly use the virtual keyboard as an actual keyboard. Generally, the electronic device provides an input method kernel engine for each of the dual keyboards. The input method kernel engine is a software toolkit that is between a platform typing interface and underlying Chinese character data and that provides Chinese character candidates for an input method through a Pinyin conversion algorithm. Each input method kernel engine corresponds to a keyboard of one type.

In the related art, to implement dual keyboards, two input method kernel engines need to be used, resulting in a large quantity of occupied resources. In addition, self-made words entered by a user using a keyboard of one type cannot be entered through a keyboard of another type, resulting in a poor experience when the user switches between the dual keyboards.

SUMMARY

Some embodiments provide a keyboard input method and system, a computer-readable storage medium, an electronic device, and a computer program product, to reduce a quantity of occupied resources for implementing dual keyboards.

Some embodiments provide a keyboard input method, performed by an electronic device, including: obtaining inputted information of a current input keyboard, and determining a first type of the current input keyboard based on the inputted information; loading, based on the first type being inconsistent with a second type of a previous input keyboard used during a previously performed input operation, a system word vocabulary and a conversion algorithm model that correspond to the first type from a library; obtaining user entry information corresponding to the inputted information from a user lexicon that has been loaded, the user lexicon comprising a user entry used based on an input keyboard of any type, and the user lexicon, the system word vocabulary, and the conversion algorithm model being set in a same input method kernel engine; obtaining system entry information corresponding to the inputted information from the system word vocabulary; and determining a list of to-be-selected entries corresponding to the inputted information according to the user entry information, the system entry information, and the conversion algorithm model, and outputting the list of to-be-selected entries.

Some embodiments provide a keyboard input system, including: at least one memory configured to store program code; and at least one processor configured to read the program code and operate as instructed by the program code, the program code comprising: first determining code configured to cause at least one of the at least one processor to obtain inputted information of a current input keyboard, and determine a first type of the current input keyboard; loading code configured to cause at least one of the at least one processor to load, based on the first type of the current input keyboard being inconsistent with a second type of an input keyboard used during a previously performed input operation, a system word vocabulary and a conversion algorithm model that correspond to the first type from a library; first obtaining code configured to cause at least one of the at least one processor to obtain user entry information corresponding to the inputted information from a user lexicon that has been loaded, and obtain system entry information corresponding to the inputted information from the system word vocabulary, the user lexicon comprising a user entry used based on an input keyboard of any type, and the user lexicon, the system word vocabulary, and the conversion algorithm model set in the same input method kernel engine; and output code configured to cause at least one of the at least one processor to determine a list of to-be-selected entries corresponding to the inputted information according to the user entry information, the system entry information, and the conversion algorithm model, and output the list of to-be-selected entries.

Some embodiments provide a non-transitory computer-readable storage medium storing computer code which, when executed by at least one processor, causes the at least one processor to at least: obtain inputted information of a current input keyboard, and determining a first type of the current input keyboard based on the inputted information; load, based on the first type being inconsistent with a second type of a previous input keyboard used during a previously performed input operation, a system word vocabulary and a conversion algorithm model that correspond to the first type from a library; obtain user entry information corresponding to the inputted information from a user lexicon that has been loaded, the user lexicon comprising a user entry used based on an input keyboard of any type, and the user lexicon, the system word vocabulary, and the conversion algorithm model being set in a same input method kernel engine; obtain system entry information corresponding to the inputted information from the system word vocabulary; and determine a list of to-be-selected entries corresponding to the inputted information according to the user entry information, the system entry information, and the conversion algorithm model, and outputting the list of to-be-selected entries.

In view of the above, in some embodiments, only one input method kernel engine is set for an electronic device with dual keyboards. In a case that it is detected that a first type of a current input keyboard is different from a second type of an input keyboard used during a previously performed input operation, a system word vocabulary and a conversion algorithm model that correspond to the current input keyboard in the input method kernel engine are loaded, and a list of to-be-selected entries corresponding to inputted information can be outputted according to a user lexicon that has been loaded, the system word vocabulary, and the conversion algorithm model. In this process, the electronic device only loads partial information in the same input method kernel engine at a specific moment, that is, information related to the input keyboard at this moment. In a case that a type of the input keyboard is switched, it is unnecessary to reload complete information of another input method kernel engine, and only information related to an input keyboard after the switching needs to be reloaded, so that less resources are occupied during the switching of the input keyboard and a switching time of the input keyboard can be shortened. In addition, because input keyboards of a plurality of types share the user lexicon, a user entry stored into a system through an input keyboard of any type can be shared, so that input efficiency can be improved.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In the specification, claims, and accompanying drawings, the terms "first", "second", "third", "fourth", and so on (if existent) are intended to distinguish between similar objects but do not necessarily indicate a specific order or sequence. It is to be understood that the data termed in such a way are interchangeable in proper circumstances so that the embodiments described herein can be implemented in orders except the order illustrated or described herein. In addition, the terms "include", "comprise" and any other variants mean to cover the non-exclusive inclusion, for example, a process, method, system, product, or device that includes a list of operations or units is not necessarily limited to those operations or modules, but may include other operations or units not expressly listed or inherent to such a process, method, product, or device.

Figure 1:
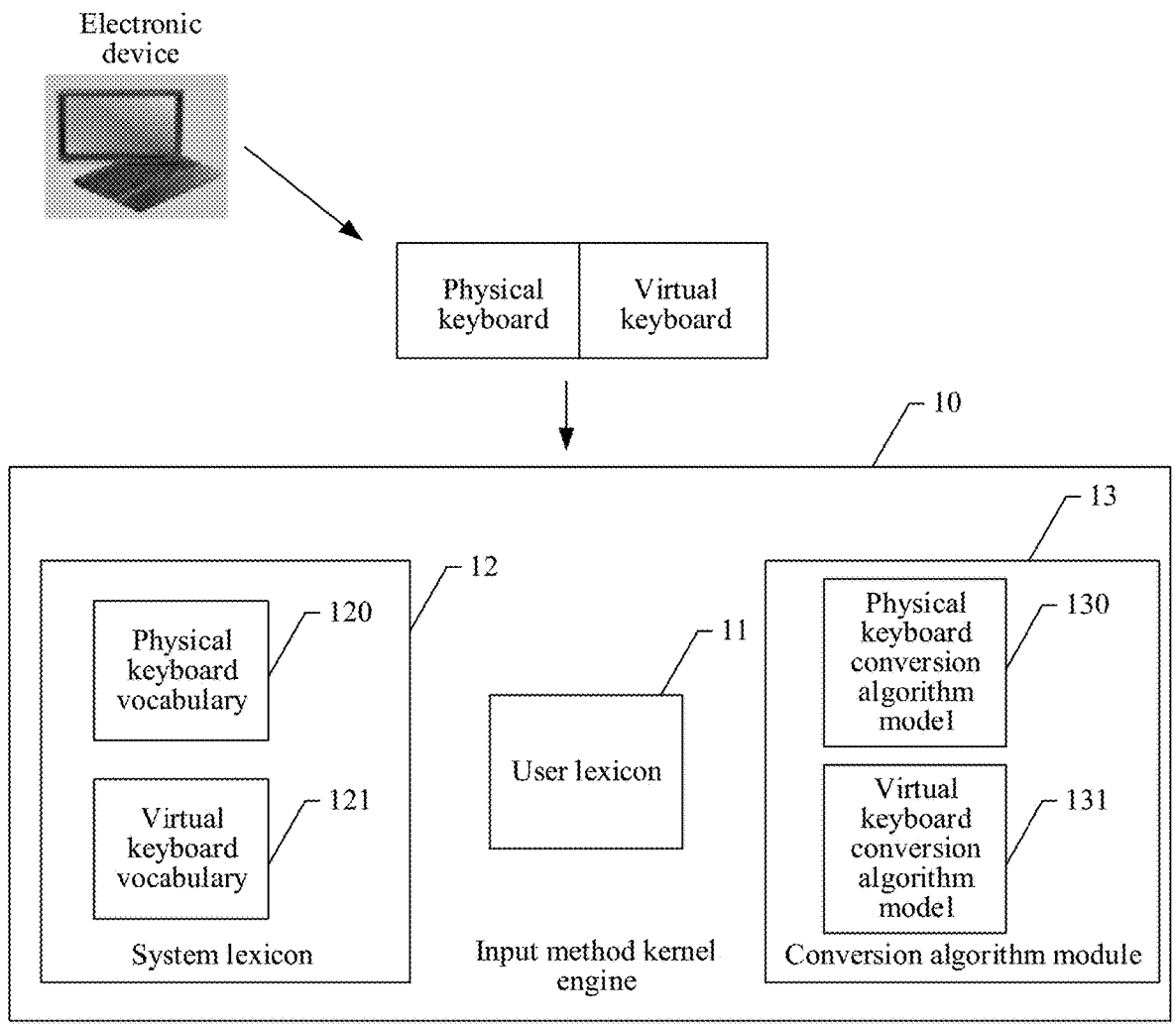
FIG. 1 is a schematic structural diagram of an electronic device of a keyboard input method according to some embodiments.

Some embodiments provide a keyboard input method, applicable to an electronic device with dual keyboards (a physical keyboard and a virtual keyboard) shown in FIG. 1. As shown in FIG. 1, the electronic device in some embodiments includes one input method kernel engine 10, which can comprehensively manage input processes of the electronic device through the physical keyboard and the virtual keyboard. In some embodiments, the input method kernel engine 10 includes a user lexicon 11, a system lexicon 12, and a conversion algorithm model 13.

The user lexicon 11 includes a plurality of user entries inputted through an input keyboard of any type (the physical keyboard or the virtual keyboard) of the electronic device and on-screen frequencies of the user entries.

The user entry herein refers to an entry corresponding to a keyword and selected by a user from to-be-selected entries in a case that the user enters the keyword through the input keyboard and after the input method kernel engine 10 provides the to-be-selected entries to the user according to the keyword entered by the user. For example, in a case that a user enters a keyword "zhaoyitao", and an entry selected by the user is " 赵一涛", " 赵一涛 is a user entry. A corresponding on-screen frequency is set for each user entry in the user lexicon 11. The on-screen frequency is configured to represent a frequency at which the input method kernel engine 10 selects a user entry as an entry for the user to select and displays it on a screen of the electronic device. The on-screen frequency changes dynamically.

The system lexicon 12 is a built-in lexicon of an input method application and configured to recall an input method system word. Data stored in the system lexicon 12 has a unified system lexicon format, and may include system word vocabularies respectively corresponding to input keyboards of different types, that is, a physical keyboard vocabulary 120 and a virtual keyboard vocabulary 121.

The conversion algorithm model 13 is configured to generate a list of to-be-selected entries based on the system entry provided by the system lexicon, the user entry provided by the user lexicon, and the on-screen frequency of the user entry, and output the list of to-be-selected entries.

The design principle of the conversion algorithm is to be compatible with and support algorithm parameters and algorithm data models corresponding to input keyboards of different types under the unified Pinyin conversion algorithm framework. In a case that the input keyboard includes a physical keyboard and a virtual keyboard, the conversion algorithm model 13 includes a physical keyboard conversion algorithm model 130 and a virtual keyboard conversion algorithm model 131.

The conversion algorithm may include a plurality of sub-algorithms. Moreover, each sub-algorithm includes a unified algorithm procedure and algorithm parameters and data models corresponding to input keyboards of different types. In some embodiments, any sub-algorithm may correspond to a fixed algorithm network structure. In addition, during execution of the sub-algorithms for input keyboards of different types, algorithm parameters and data models corresponding to the types of the input keyboards may be applied to the algorithm network structure. Based on this, the physical keyboard conversion algorithm model 130 may include a data model of the physical keyboard based on a plurality of sub-algorithms, and the virtual keyboard conversion algorithm model 131 includes a data model of the virtual keyboard based on a plurality of sub-algorithms.

Because input keyboards of different types have different features, a data model of an input keyboard of any type based on any sub-algorithm is obtained by training the foregoing algorithm network structure according to features of the corresponding type of input keyboard and usage habit information of the user using the input keyboard. For example, features of the physical keyboard may include a quantity of keys arranged on the physical keyboard, key distribution information, and the like. Features of the virtual keyboard may include a quantity of displayed keys, display positions of the keys, and the like.

In some embodiments, the electronic device may include, but not limited to, a mobile phone, a computer, an intelligent voice interaction device, an intelligent household appliance, an in-vehicle terminal, an aircraft, and the like.

Figure 2:
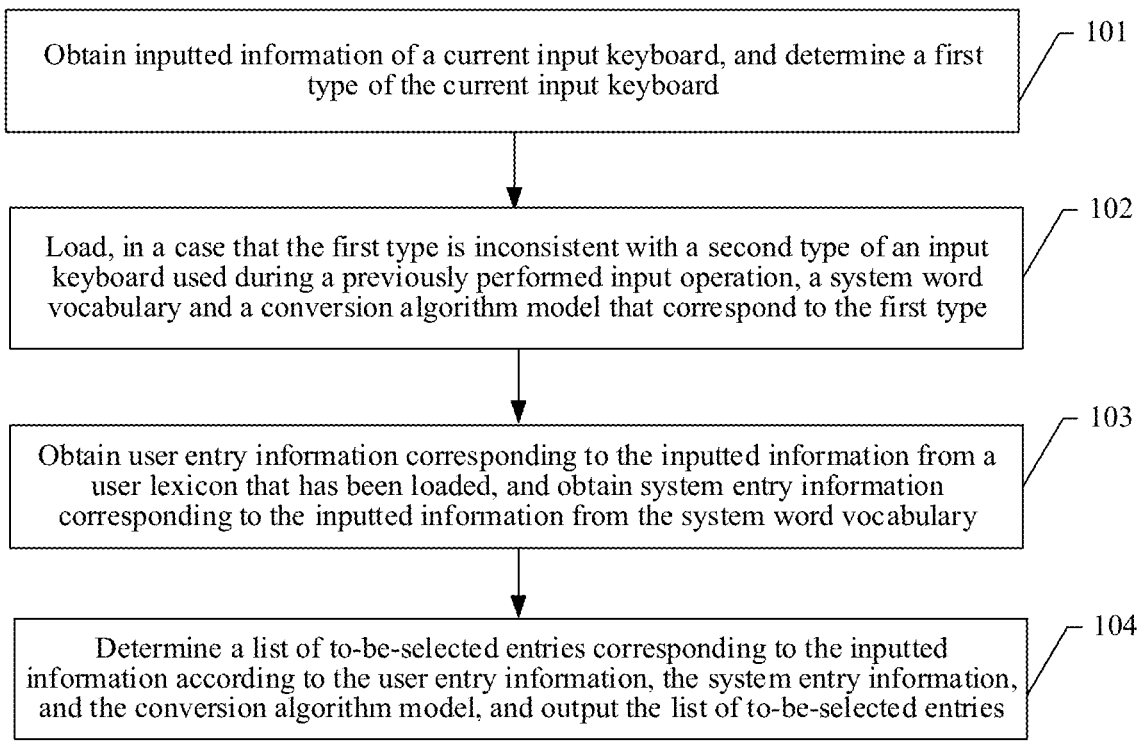
FIG. 2 is a flowchart of a keyboard input method according to some embodiments.

As shown in FIG. 2, in some embodiments, the electronic device may implement keyboard input through the following operations:

Operation 101: Obtain inputted information of a current input keyboard, and determine a first type of the current input keyboard.

It may be understood that, a user may operate the electronic device to start an input keyboard of any type. For example, the user performs an operation of starting a virtual keyboard, to trigger the electronic device to start the virtual keyboard and display an operation interface of the virtual keyboard, and the user may enter information on the operation interface. In this case, the first type of the current input keyboard is the virtual keyboard. In a case that the user performs an operation of closing the virtual keyboard, the electronic device is triggered to start the physical keyboard. The user may enter information through the physical keyboard. The first type of the current input keyboard is the physical keyboard.

In some embodiments, in a case that the electronic device starts the virtual keyboard, content related to the virtual keyboard in the input method kernel engine 10 may be loaded, for example, the foregoing virtual keyboard parameter model 131 and the foregoing virtual keyboard vocabulary 121, and content related to the physical keyboard is deleted from the memory, that is, the physical keyboard parameter model 130 and the physical keyboard vocabulary 120 are deleted. In a case that the electronic device starts the physical keyboard, content related to the physical keyboard in the input method kernel engine 10 may be loaded, for example, the foregoing physical keyboard parameter model 130 and the foregoing physical keyboard vocabulary 120, and content related to the virtual keyboard is deleted from the memory, that is, the virtual keyboard parameter model 131 and the virtual keyboard vocabulary 121 are deleted.

In some embodiments, in a case that the first type of the current input keyboard is the virtual keyboard, the current input keyboard is displayed on the screen of the electronic device, and information may be inputted by touching or clicking on input controls in the virtual keyboard. In a case that the first type of the current input keyboard is the physical keyboard, information is inputted by pressing physical keys on the physical keyboard. In some embodiments, the inputted information is Pinyin, and to-be-inputted Chinese characters need to be determined according to the inputted information.

Operation 102: Load, in a case that the first type is inconsistent with a second type of an input keyboard used during a previously performed input operation, a system word vocabulary and a conversion algorithm model that correspond to the first type.

Since the electronic device has already loaded the user lexicon in response to starting the previous input keyboard, the user lexicon does not need to be loaded again, instead, content related to the current input keyboard, including the system word vocabulary corresponding to the first type of the current input keyboard and the conversion algorithm model corresponding to the first type, and further, content previously loaded and related to the previous input keyboard, that is, the system word vocabulary corresponding to the second type of the previous input keyboard and the conversion algorithm model corresponding to the second type, needs to be deleted from the memory, thereby reducing occupied memory resources.

In some embodiments, in a case that the first type of the current input keyboard is consistent with the second type of the input keyboard used during the previously performed input operation, there is no need to load any information, and information about to-be-selected entries corresponding to the foregoing inputted information is directly outputted according to the content previously loaded and related to the previous input keyboard.

Operation 103: Obtain user entry information corresponding to the inputted information from a user lexicon that has been loaded, and obtain system entry information corresponding to the inputted information from the system word vocabulary.

The user lexicon herein includes a user entry used based on an input keyboard of any type and an on-screen frequency of the user entry, and the user lexicon, the system word vocabulary, and the conversion algorithm model are set in the same input method kernel engine.

In some embodiments, each user entry in the user lexicon corresponds to a reference character string. The reference character string may be a character string entered by the user in a case that the user previously selects the user entry. For example, in a case that the user previously enters a character string "jint", and selects "今天" from to-be-selected entries, the reference character string corresponding to the user entry is "jint". A user entry corresponding to the inputted information is obtained from the loaded user lexicon. During implementation, the inputted information is matched with reference character strings corresponding to user entries in the user lexicon. In a case that the inputted information is the same as a specific reference character string, a user entry corresponding to the reference character string is determined as a user entry corresponding to the inputted information, and an on-screen frequency of the user entry is obtained.

Each system entry in the system word vocabulary corresponds to one system character string. The system character string is a full Pinyin character string of the system entry. For example, in a case that the system entry is "今天", a system character string corresponding to the system entry "今天" is "jintian". In a case that system entry information corresponding to the inputted information is obtained from the system word vocabulary, the inputted information is matched with system character strings corresponding to system entries in the system word vocabulary, matching results between the inputted information and the system character strings are determined, a system entry corresponding to a system character string whose matching result is greater than a preset matching threshold is determined to as a system entry corresponding to the inputted information, and a system term frequency corresponding to the system entry is obtained.

In some embodiments, the input method kernel engine 10 may determine, based on the user lexicon 11, user entry information such as a user entry corresponding to the inputted information and an on-screen frequency of the user entry, and determine, from the system word vocabulary (for example, the foregoing physical keyboard vocabulary 120 or virtual keyboard vocabulary 121), system entry information such as a system entry corresponding to the inputted information and a system term frequency of the system entry.

Operation 104: Determine a list of to-be-selected entries corresponding to the inputted information according to the user entry information, the system entry information, and the conversion algorithm model, and output the list of to-be-selected entries.

In some embodiments, to output the list of to-be-selected entries is to output the list of to-be-selected entries to the screen of the electronic device for display.

In some embodiments, the conversion algorithm model 13 in the keyboard input system may determine candidate scores respectively corresponding to the user entry and the system entry according to the on-screen frequency of the user entry and the system term frequency of the system entry. The user entry and the system entry that are included in the list of to-be-selected entries, and sorting information of the entries in the list of to-be-selected entries on the screen of the electronic device determining are determined according to the candidate scores. Generally, in entries in the list of to-be-selected entries, a user entry generally ranks at a higher position, and an entry corresponding to complete information included in the inputted information also ranks at a higher position, and an entry corresponding to partial information included in the inputted information ranks at a lower position.

In some embodiments, the on-screen frequency of the user entry may be weighted using a preset first weight, to obtain a candidate score corresponding to the user entry, and the system term frequency of the system entry may be weighted using a preset second weight, to obtain a candidate score corresponding to the system entry. Then, the user entry and the system entry are sorted in descending order according to the candidate scores, to obtain sorted entries. A list of to-be-selected entries is constructed using the first N entries in the sorted entries, and a sorting order of the first N entries is determined as sorting information of entries in the list of to-be-selected entries on the screen.

In this way, the input method kernel engine 10 may output information about to-be-selected entries to the screen of the electronic device for display, for the user to select.

In view of the above, in the method of this embodiment, only one input method kernel engine 10 is set for an electronic device with dual keyboards. In a case that it is detected that a first type of a current input keyboard is different from a second type of a previous input keyboard, a system word vocabulary and a conversion algorithm model that correspond to the current input keyboard in the input method kernel engine 10 are loaded, and a list of to-be-selected entries corresponding to inputted information can be outputted according to a user lexicon 11 that has been loaded, the system word vocabulary, and the conversion algorithm model. In this process, the electronic device only loads partial information in the same input method kernel engine 10 at a specific moment, that is, information related to the input keyboard at this moment. In a case that a type of the input keyboard is switched, it is unnecessary to reload complete information of another input method kernel engine 10, and only information related to an input keyboard after the switching needs to be reloaded, so that less resources are occupied during the switching of the input keyboard and a switching time of the input keyboard can be shortened. In addition, because input keyboards of a plurality of types share the user lexicon 11, a user entry stored into a system through an input keyboard of any type can be shared, so that input efficiency can be improved.

The keyboard input method provided by some embodiments is applicable to the system shown in FIG. 1. In some embodiments, lexicon content searching and lexicon content addition may be completed through the user lexicon 11.

The lexicon content searching includes: In a case that a user enters information through an input keyboard of any type, searching is performed on the user lexicon 11 with the inputted information as a keyword, and after a user entry corresponding to the inputted information is found through the searching, information, such as an inputted string and an on-screen frequency that correspond to the user entry, is transferred to the conversion algorithm model 13 for Pinyin conversion. The inputted string corresponding to the user entry herein may be a complete character string or a partial character string included in the information inputted through the input keyboard.

The lexicon content addition includes: In a case that a user enters information through an input keyboard of any type, in a case that the inputted information is inputted for the first time, after an entry corresponding to the inputted information is selected by the user, the entry selected by the user is added to the user lexicon 11, and an on-screen frequency of the entry is set. In a case that the inputted information is not inputted for the first time, that is, the user entry corresponding to the inputted information has been stored in the user lexicon 11, an on-screen frequency of the user entry is updated, for example, the on-screen frequency of the user entry may be increased by 1.

Figure 3:
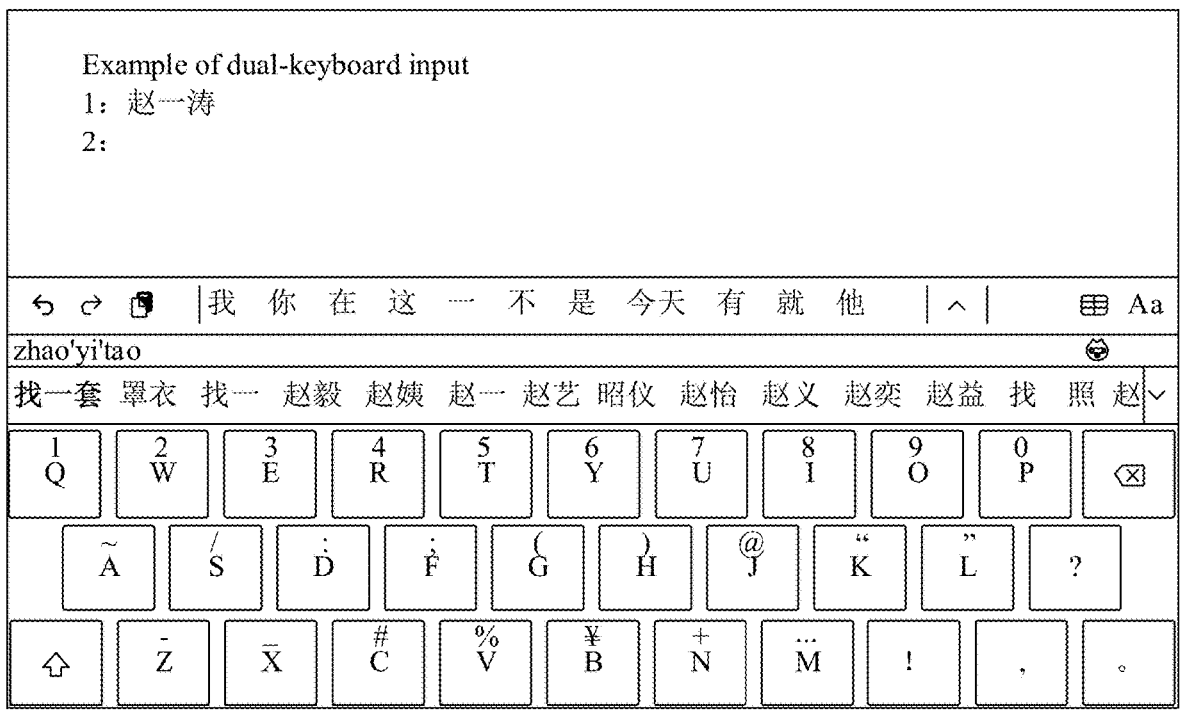
FIG. 3 is a schematic diagram of a list of to-be-selected entries displayed by an electronic device according to some embodiments.

For example, as shown in FIG. 3, in a case that the user enters "zhaoyitao" using an input keyboard of a specific type, the input method kernel engine 10 may obtain a list of to-be-selected entries for the user to select, and output the list of to-be-selected entries to the screen of the electronic device for display, for example, "赵一涛", "找一套", "照一套", "找一", "赵毅", "赵媳", "找一", "赵芭", and "昭伏". In the list of to-be-selected entries, "赵一涛" is a user entry and may rank first in the list of to-be-selected entries, and "找一下" the like are system entries provided in the system lexicon 12.

Data stored in the system lexicon 12 has a unified system lexicon format, and may include system word vocabularies respectively corresponding to input keyboards of different types, that is, a physical keyboard vocabulary 120 and a virtual keyboard vocabulary 121.

The system lexicon data format can not only distinguish system lexicon types of input keyboards of different types, but also be compatible with lexicon content of input keyboards of different types. Data stored in the physical keyboard vocabulary 120 and the virtual keyboard vocabulary 121 may mainly be divided into a system lexicon header area and a system lexicon data area.

The system lexicon header area includes a lexicon production time, a lexicon version, a system lexicon type, a lexicon entry count, a lexicon check value, and the like. The system lexicon type herein is configured to describe type values corresponding to input keyboards of different types. For example, a virtual keyboard lexicon corresponds to a type 1, and a physical keyboard lexicon corresponds to a type 2. A value of the system lexicon type is determined and written during a lexicon production stage, is read and used in the lexicon use stage, and is not changed thereafter.

The system lexicon data area is configured to store each piece of system entry data, including a pinyin string, a Chinese character string, a system term frequency, and the like, corresponding to a vocabulary of the input keyboard. Differences between vocabularies of input keyboards of different types may include: Entry lists with Chinese character strings as keywords are different, system term frequencies of the same Chinese character are different, and so on. The system term frequency refers to a frequency at which each system entry is provided for a user to select. Generally, system term frequencies of system entries are fixed. However, between vocabularies of input keyboards of different types, the same system entry may correspond to different system term frequencies.

The conversion algorithm model 13 is configured to generate a list of to-be-selected entries based on the system entry provided by the system lexicon, the user entry provided by the user lexicon, and the on-screen frequency of the user entry, and output the list of to-be-selected entries. Input keyboards of different types correspond to different conversion algorithm models. For example, in a case that the input keyboard includes a physical keyboard and a virtual keyboard, the conversion algorithm model 13 includes a physical keyboard conversion algorithm model 130 and a virtual keyboard conversion algorithm model 131.

Figure 4:
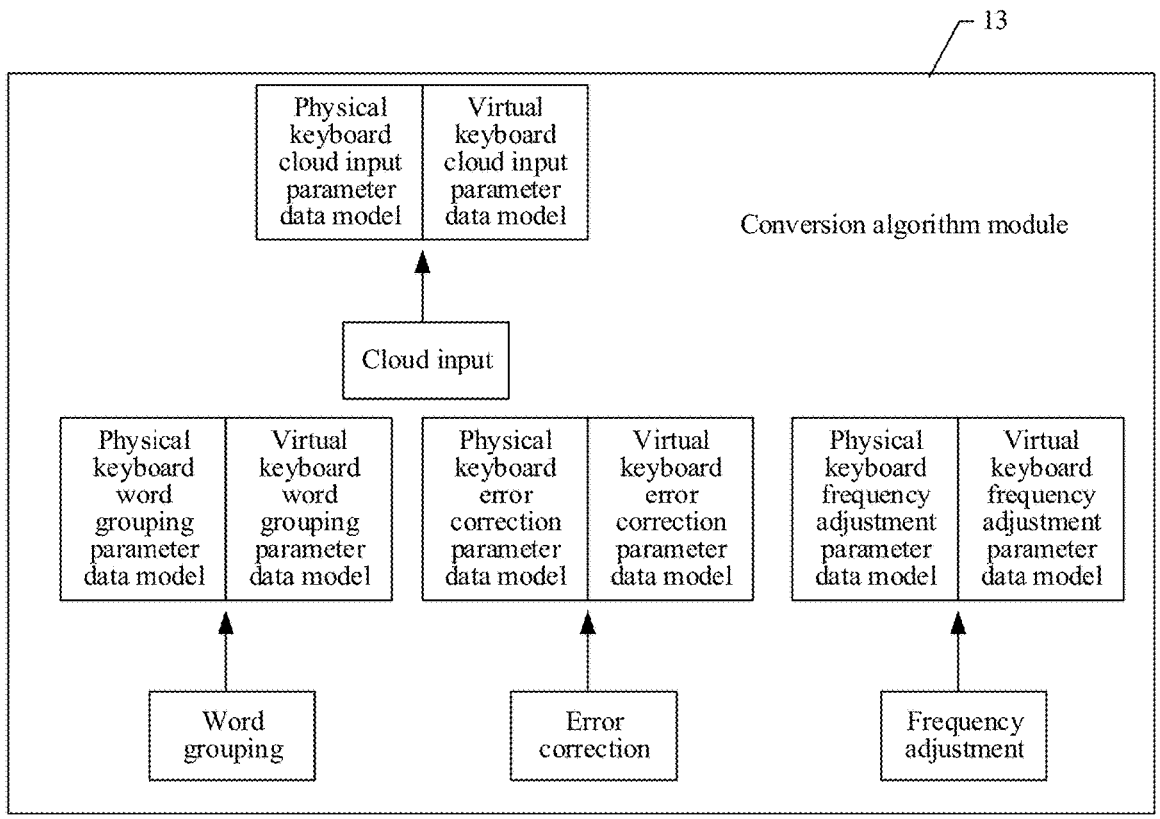
FIG. 4 is a schematic diagram of a conversion algorithm model according to some embodiments.

In some embodiments, as shown in FIG. 4, the conversion algorithm may include several sub-algorithms such as a word grouping algorithm, an error correction algorithm, a frequency adjustment algorithm, and a cloud input algorithm. Moreover, each sub-algorithm includes a unified algorithm procedure and algorithm parameters and data models corresponding to input keyboards of different types. In this way, in a case that a conversion algorithm model of an input keyboard of each type may include parameter data models that are respectively based on a plurality of sub-algorithms and that are of an input keyboard of any type, the physical keyboard parameter model 130 includes a physical keyboard word grouping parameter data model, a physical keyboard error correction parameter data model, a physical keyboard frequency adjustment parameter data model, and a physical keyboard cloud input parameter data model, and the virtual keyboard parameter model 131 includes a virtual keyboard word grouping parameter data model, a virtual keyboard error correction parameter data model, a virtual keyboard frequency adjustment parameter data model, and a virtual keyboard cloud input parameter data model.

The word grouping algorithm is configured to split the inputted information in a case that no user entry or system entry can be determined based on the inputted information, to obtain splitting results, then determine entries corresponding to the splitting results, and combine the entries, to obtain an entry corresponding to the inputted information.

The frequency adjustment algorithm is configured to adjust a frequency of the user entry. Adjustment of the frequency of the user entry may affect an order of the user entry in the list of to-be-selected entries. The frequency adjustment algorithm may be divided into a fast frequency adjustment algorithm and a progressive frequency adjustment algorithm. Through the fast frequency adjustment algorithm, an entry just inputted can be adjusted to the first position in the list of to-be-selected entries. The progressive frequency adjustment algorithm adjusts a frequency of a user entry properly each time the user entry is inputted, to move a position of the user entry forward.

The error correction algorithm may include four stages, that is, a character string error correction and recall stage, a syllable string error correction and recall stage, an error correction candidate generation stage, and an error correction candidate sorting stage. Algorithm parameters of the error correction algorithm include: a simplified Pinyin error correction penalty score, an error correction candidate display threshold, an error correction recall beam search width, an error correction candidate display count, and the like. An algorithm data model of the error correction algorithm includes: an adjacent key model, a character error correction model, a syllable error correction model, a Gaussian model, and the like. An error correction parameter data model of an input keyboard of any type is obtained through training according to characteristics of input keyboards of different types and usage habits of a user.

The cloud input algorithm is configured to transmit the inputted information to a cloud server, to determine the inputted information on a side of the cloud server and determine a cloud candidate entry corresponding to the inputted information from the user lexicon and system word vocabulary stored in the cloud server.

Because the system word vocabulary stored in the cloud server may be richer in content than the system word vocabulary stored locally in the electronic device, the cloud candidate entry may be different from to-be-selected entries determined by the electronic device. The cloud candidate entry includes one or more candidate entries. After obtaining the cloud candidate entries, the electronic device adds a cloud candidate entry that is in one or more cloud to-be-selected entries and that is different from all to-be-selected entries in the list of to-be-selected entries to the list of to-be-selected entries. For example, the cloud candidate entry may be inserted after the first to-be-selected entry into the list of to-be-selected entries. In some embodiments, in a case that the electronic device displays the list of to-be-selected entries, a cloud identifier may be displayed in a display area of the cloud candidate entry to prompt the user that the entry is determined by the cloud server.

Figure 5:
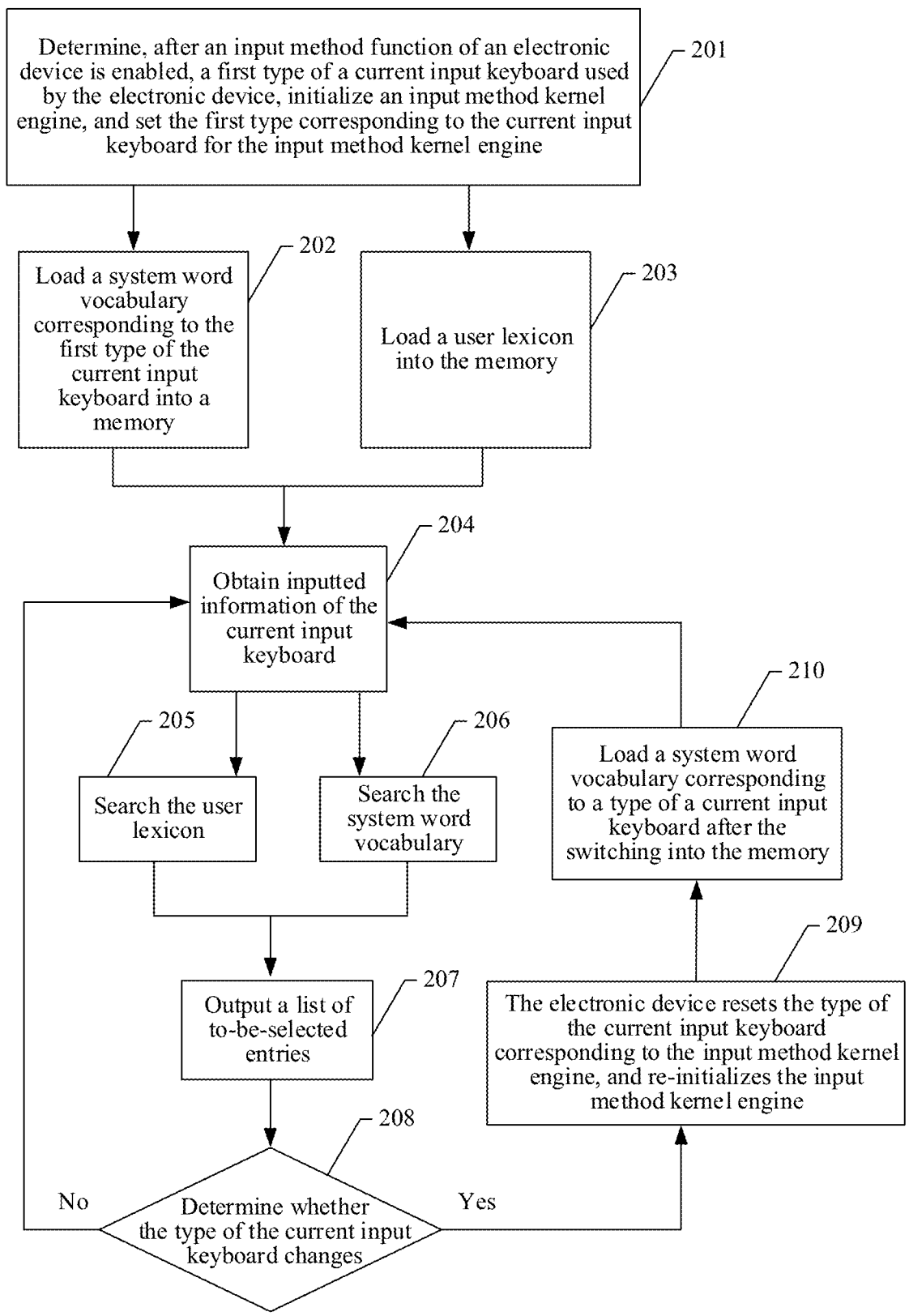
FIG. 5 is a flowchart of a keyboard input method according to some embodiments.

In some embodiments, as shown in FIG. 5, the electronic device may implement keyboard input according to following operations:

Operation 201: Determine, after an input method function of the electronic device is enabled, a first type of a current input keyboard used by the electronic device, initialize an input method kernel engine, and set the first type corresponding to the current input keyboard for the input method kernel engine.

In a process of initializing the input method kernel engine, the electronic device may load a conversion algorithm model corresponding to the first type of the current input keyboard into a memory corresponding to an input method process.

Operation 202: Load a system word vocabulary corresponding to the first type of the current input keyboard into the memory.

In some embodiments, the system word vocabulary corresponding to the first type of the current input keyboard is loaded into the memory corresponding to the input method process. After the loading is completed, an address of the memory occupied by the loaded system word vocabulary is obtained, and the address of the memory occupied by the loaded system word vocabulary is transmitted to the input method kernel engine.

Operation 203: Load a user lexicon into the memory.

In some embodiments, the user lexicon is loaded into the memory corresponding to the input method process. After the loading of the user lexicon is completed, an address of a memory occupied by the loaded user lexicon is obtained, and the address of the memory occupied by the loaded user lexicon is transmitted to the input method kernel engine.

Operation 204: Obtain inputted information of the current input keyboard.

In some embodiments, the input method kernel engine enters a loop state of inputted information conversion, that is, detects the inputted information inputted through the current input keyboard, and outputs a list of to-be-selected entries according to the inputted information.

Operation 205: Search the user lexicon.

In some embodiments, in response to detecting the inputted information inputted through the current input keyboard, the input method kernel engine searches the user lexicon according to the inputted information, to obtain a user entry corresponding to the inputted information and an on-screen frequency of the user entry.

Operation 206: Search the system word vocabulary.

In some embodiments, information, such as a system entry corresponding to the inputted information and a system term frequency corresponding to the system entry, is obtained from the system word vocabulary of the current input keyboard.

Operation 207: Output a list of to-be-selected entries.

In some embodiments, to-be-selected entries included in the list of to-be-selected entries and sorting information of the to-be-selected entries on the screen of the electronic device are determined, by using the conversion algorithm model corresponding to the current input keyboard, according to a user entry previously found through searching and an on-screen frequency thereof, as well as a system entry and a system term frequency thereof.

Finally, the to-be-selected entries in the list of to-be-selected entries may be outputted according to the sorting information to the screen of the electronic device for display.

Operation 208: Determine whether the type of the current input keyboard changes.

In some embodiments, the input method kernel engine may detect whether the type of the current input keyboard changes, and whether the type is consistent with a type of an input keyboard used in a previously performed input operation. In a case that the types are consistent, operation 204 is performed again. In a case that the types are inconsistent, for example, if the previous input keyboard is a physical keyboard, and the current input keyboard is a virtual keyboard, operation 209 is performed.

Operation 209: The electronic device resets the type of the current input keyboard corresponding to the input method kernel engine, and re-initializes the input method kernel engine.

In a process of re-initializing the input method kernel engine, the electronic device may load a conversion algorithm model corresponding to a type of a current input keyboard after the switching into the memory.

Operation 210: Load a system word vocabulary corresponding to a type of a current input keyboard after the switching into the memory.

In some embodiments, after the loading is completed, the input method kernel engine is notified of an address of the memory occupied by the loaded system word vocabulary, and the system word vocabulary corresponding to the type of the previous input keyboard is deleted from the memory. Further, operation 204 is performed again.

By setting two input method kernel engine in an electronic device with dual keyboards in the related art, a size of memory occupied by an input keyboard during switching is 60 MB. However, in response to using only one input method kernel engine 10 set in an electronic device in some embodiments, a size of memory occupied by an input keyboard during switching is reduced by 50%, to about 30 MB. In the related art, a size of a resource occupied by two input method kernel engines set in an electronic device with dual keyboards is 42 MB. However, a size of a resource occupied by using only one input method kernel engine 10 set in an electronic device in some embodiments is reduced by 50%, to about 21 MB.

In view of the above, in the keyboard input method according to some embodiments, only one input method kernel engine 10 is set in an electronic device with dual keyboards, to resolve the problems that too many resources are occupied and a user entry cannot be shared between input keyboards of different types that are caused by two input method kernel engines. Using only a user lexicon 11 in one input method kernel engine 10 implements sharing of a user entry between input keyboards of different types. In a case that an input keyboard of the electronic device is of a specific type, only partial information related to the current input keyboard in the input method kernel engine 10 needs to be loaded. In addition, after the input keyboard is switched, only the partial information loaded in the memory and related to the current input keyboard needs to be switched, which reduces a quantity of occupied resources.

The keyboard input method according to some embodiments is described below. A keyboard input system according to some embodiments is mainly a distributed system 100. The distributed system may include a client 300 and a plurality of nodes 200 (a computing device in any form in an access network, for example, a server or a user terminal). The client 300 are connected to the nodes 200 through network communication.

Figure 6:
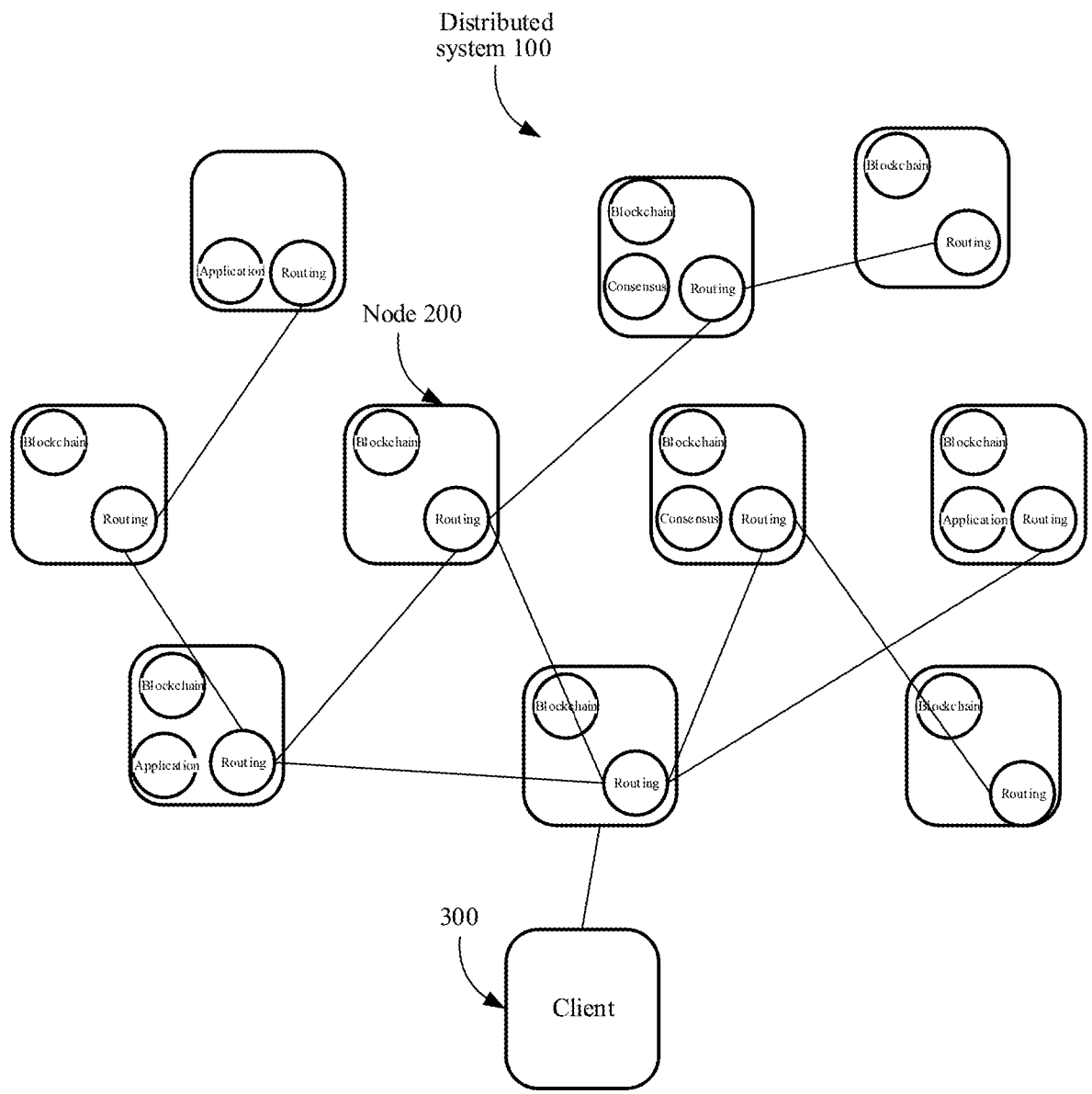
FIG. 6 is a schematic diagram of a distributed system to which a keyboard input method according to some embodiments.

For example, the distributed system is a blockchain system. FIG. 6 is a schematic structural diagram of a distributed system 100 applied to a blockchain system according to some embodiments. The distributed system is formed of a plurality of nodes 200 (computing devices in any form in an access network, such as, servers and user terminals) and a client 300. A peer-to-peer (P2P) network is formed between the nodes. The P2P protocol is an application-layer protocol running over the Transmission Control Protocol (TCP). Any machine such as a server or a terminal may be added to the distributed system to become a node. The nodes include a hardware layer, an intermediate layer, an operating system layer, and an application layer.

Referring to functions of each node in the blockchain system shown in FIG. 6, the related functions include the following:

(1) Routing: Routing is a basic function of the node, and is used for supporting communication between nodes.

In addition to the routing function, the node may further have the following functions:

(2) Application: An application is deployed in a blockchain, and is configured to implement a particular service according to an actual service requirement, record data related to function implementation to form recorded data, add a digital signature to the recorded data to indicate a source of task data, and transmit the recorded data to another node in the blockchain system, so that the another node adds the recorded data to a temporary block in response to successfully verifying a source and integrity of the recorded data.

For example, the service implemented by the application includes code implementing a keyboard input function. The keyboard input function mainly includes:

detecting inputted information of a current input keyboard of the electronic device, and detecting a type of the current input keyboard; loading, in a case that the type of the current input keyboard is inconsistent with a type of a previous input keyboard previously detected, a system word vocabulary and a conversion algorithm model that correspond to the type of the current input keyboard; obtaining user entry information and system entry information that correspond to the inputted information from a user lexicon that has been loaded and the system word vocabulary, the user lexicon including a user entry used based on an input keyboard of any type, and the user lexicon, the system word vocabulary, and the conversion algorithm model set in the same input method kernel engine; and determining a list of to-be-selected entries corresponding to the inputted information according to the user entry information, the system entry information, and the conversion algorithm model, and outputting the list of to-be-selected entries.

(3) Blockchain: A blockchain includes a series of blocks that are consecutive in a chronological order of generation. Once a new block is added to the blockchain, the new block is no longer removed. The block records recorded data submitted by the node in the blockchain system.

Figure 7:
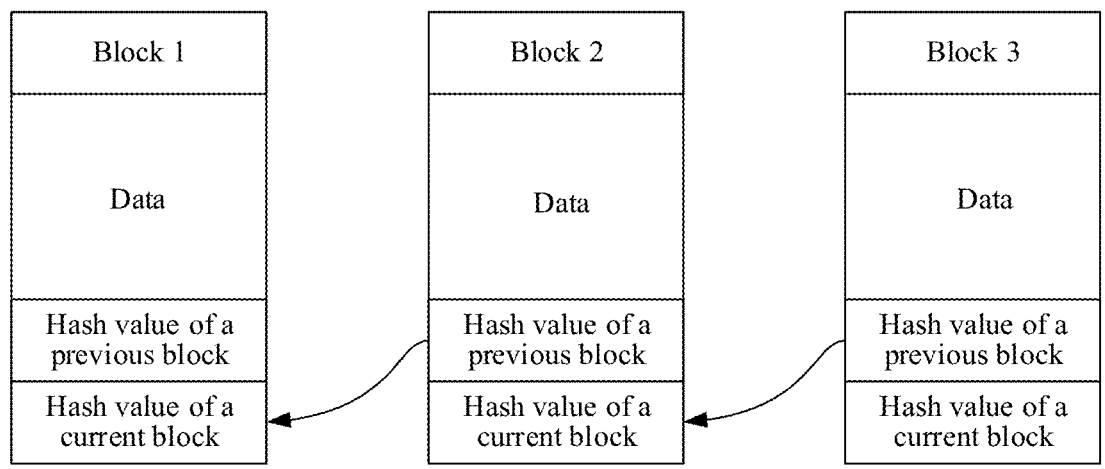
FIG. 7 is a schematic diagram of a block structure according to some embodiments.

FIG. 7 is a schematic diagram of a block structure according to some embodiments. Each block includes a hash value of a transaction record stored in the current block (a hash value of the current block) and a hash value of a previous block. Blocks are connected according to hash values to form a blockchain. In addition, the block may further include information such as a timestamp indicating a block generation time. A blockchain is a decentralized database essentially, and is a series of associated data blocks generated by using a cryptographic method. Each data block includes related information, and is configured to verify the validity (anti-counterfeiting) of the information of the data block, and generate a next block.

Figure 8:
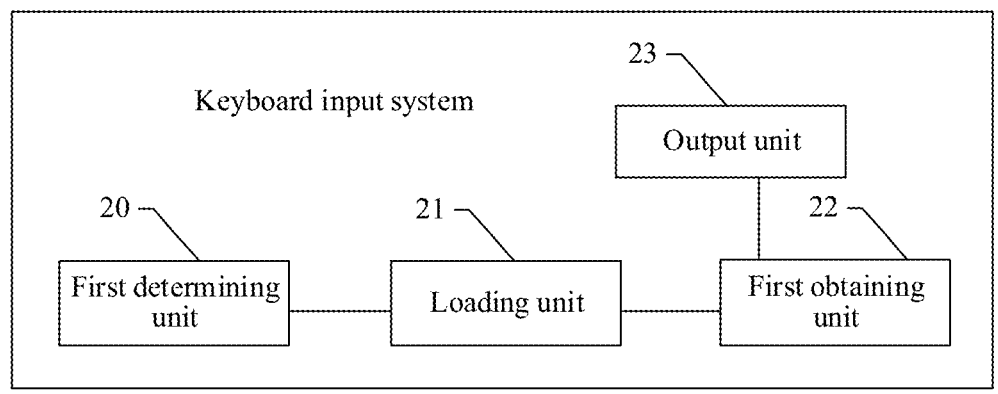
FIG. 8 is a schematic diagram of a logical structure of a keyboard input system according to some embodiments.

Some embodiments further provide a keyboard input system. A schematic structural diagram of the keyboard input system is shown in FIG. 8. The keyboard input system includes:

a first determining unit 20, configured to obtain inputted information of a current input keyboard, and determine a first type of the current input keyboard, the first type of the current input keyboard being a physical keyboard or a virtual keyboard; a loading unit 21, configured to load, in a case that the first type of the current input keyboard is inconsistent with a second type of an input keyboard used during a previously performed input operation, a system word vocabulary and a conversion algorithm model that correspond to the first type; a first obtaining unit 22, configured to obtain user entry information corresponding to the inputted information from a user lexicon that has been loaded, and obtain system entry information corresponding to the inputted information from the system word vocabulary, the user lexicon including a user entry used based on an input keyboard of any type, and the user lexicon, the system word vocabulary, and the conversion algorithm model set in the same input method kernel engine; and an output unit 23, configured to determine a list of to-be-selected entries corresponding to the inputted information according to the user entry information, the system entry information, and the conversion algorithm model, and output the list of to-be-selected entries.

The system word vocabulary corresponding to the type of the current input keyboard includes a system lexicon header area and a system lexicon data area. The system lexicon header area includes a system lexicon type, the system lexicon type being configured to describe the first type of the current input keyboard; and the system lexicon data area includes a plurality of pieces of system entry data corresponding to a vocabulary of the current input keyboard. The conversion algorithm model includes parameter data models of the current input keyboard that are respectively based on a plurality of sub-algorithms, the plurality of sub-algorithms including at least the following algorithms: a word grouping algorithm, an error correction algorithm, a frequency adjustment algorithm, and a cloud input algorithm.

The loading unit 21 is further configured to delete, from a memory in a case that the first type is inconsistent with the second type of the input keyboard used during the previously performed input operation, a system word vocabulary and a conversion algorithm model that have been loaded and that correspond to the second type.

In some embodiments, the first obtaining unit 22 is further configured to determine, from the user lexicon, a user entry corresponding to the inputted information and an on-screen frequency of the user entry; and determine, from the system word vocabulary, a system entry corresponding to the inputted information and a system term frequency of the system entry.

In some embodiments, the output unit 23 is further configured to determine candidate scores respectively corresponding to the user entry and the system entry according to the conversion algorithm model, the on-screen frequency of the user entry, and the system term frequency of the system entry; and determine, according to the candidate scores, the user entry and the system entry that are included in the list of to-be-selected entries, and sorting information of the entries in the list of to-be-selected entries on a screen of the electronic device.

In view of the above, in the system of this embodiment, only one input method kernel engine is set. In a case that a first determining unit 20 detects that a type of a current input keyboard is different from a type of a previous input keyboard, a determining and loading unit 21 loads a system word vocabulary and a conversion algorithm model that correspond to the current input keyboard in the input method kernel engine, and an first obtaining unit 22 and an output unit 23 may output a list of to-be-selected entries corresponding to inputted information according to a user lexicon that has been loaded, the system word vocabulary, and the conversion algorithm model. In this process, the keyboard input system only loads partial information in the same input method kernel engine at a specific moment, that is, information related to the input keyboard at this moment. In a case that a type of the input keyboard is switched, it is unnecessary to reload complete information of another input method kernel engine, and only information related to an input keyboard after the switching needs to be reloaded, so that less resources are occupied during the switching of the input keyboard and a switching time of the input keyboard can be shortened. In addition, because input keyboards of a plurality of types share the user lexicon, a user entry stored into a system through an input keyboard of any type can be shared, which brings a better user experience.

Figure 9:
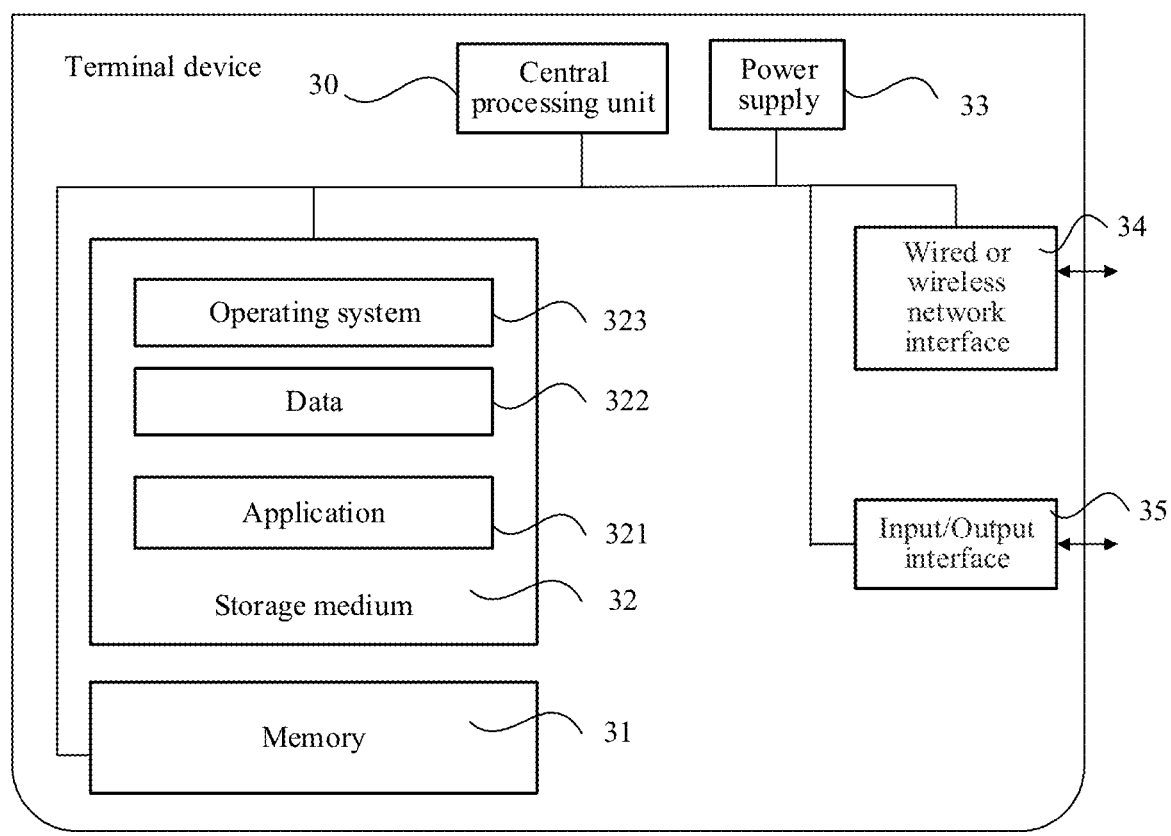
FIG. 9 is a schematic diagram of a logical structure of an electronic device according to some embodiments.

Some embodiments provide an electronic device. A schematic structural diagram of the electronic device is shown in FIG. 9. The terminal device may vary greatly due to different configurations or performance, and may include one or more central processing units (CPU) 30 (for example, one or more processors), a memory 31, and one or more storage media 32 (for example, one or more mass storage devices) that store applications 321 or data 322. The memory 31 and the storage medium 32 may be transient or persistent storages. The program stored in the storage medium 32 may include one or more modules (not shown), and each module may include a series of instruction operations for the electronic device. Still further, the CPU 30 may be configured to communicate with the storage medium 32, and perform, on the electronic device, the series of instruction operations in the storage medium 32.

In some embodiments, the application 321 stored in the storage medium 32 includes a keyboard input application, and the application may include the first determining unit 20, the loading unit 21, the first obtaining unit 22, and the output unit 23 in the foregoing keyboard input system. Details are not described herein. Still further, the CPU 30 may be configured to communicate with the storage medium 32, and perform, on the electronic device, the series of instruction operations corresponding to the keyboard input application stored in the storage medium 32.

The electronic device may further include one or more power supplies 33, one or more wired or wireless network interfaces 34, one or more input/output interfaces 35, and/or one or more operating systems 323, for example, Windows Server™, Mac OS X™, Unix™, Linux™, or FreeBSD™.

Operations performed by the keyboard input system in the foregoing method embodiment may be based on a structure of the electronic device that is shown in FIG. 9.

Further, some embodiments provide a non-transitory computer-readable storage medium, having a plurality of computer programs stored therein, the computer programs being adapted to be loaded and executed by a processor to implement the keyboard input method performed by the foregoing electronic device.

Some embodiments further provide an electronic device, including: a processor and a memory.

The memory is configured to store a plurality of computer programs, the computer programs being configured to be loaded and executed by the processor to implement the keyboard input method performed by the foregoing electronic device. The processor is configured to implement the computer programs in the plurality of computer programs.

In addition, according to some embodiments, a computer program product or a computer program is provided. The computer program product or the computer program includes computer instructions. The computer instructions are stored in a computer-readable storage medium. A processor of a computer device reads the computer instructions from the computer-readable storage medium, and executes the computer instructions, to enable that the computer device to perform the keyboard input method provided in the various embodiments.

A person of ordinary skill in the art may understand that all or some of the operations of the methods in the embodiments may be implemented by a program instructing relevant hardware. The program may be stored in a computer-readable storage medium. The storage medium may include a read-only memory (ROM), a random-access memory (RAM), a magnetic disk, an optical disc, or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A keyboard input system, comprising:
at least one memory configured to store program code; and
at least one processor configured to read the program code and operate as instructed by the program code, the program code comprising:
first determining code configured to cause at least one of the at least one processor to obtain inputted information of a current input keyboard, and determine a first type of the current input keyboard;
loading code configured to cause at least one of the at least one processor to load, based on the first type of the current input keyboard being inconsistent with a second type of an input keyboard used during a previously performed input operation, a system word vocabulary and a conversion algorithm model that correspond to the first type from a library;
first obtaining code configured to cause at least one of the at least one processor to obtain user entry information corresponding to the inputted information from a user lexicon that has been loaded, and obtain system entry information corresponding to the inputted information from the system word vocabulary, the user lexicon comprising a user entry used based on an input keyboard of any type, and the user lexicon, the system word vocabulary, and the conversion algorithm model set in the same input method kernel engine; and
output code configured to cause at least one of the at least one processor to determine a list of to-be-selected entries corresponding to the inputted information according to the user entry information, the system entry information, and the conversion algorithm model, and output the list of to-be-selected entries.

2. The keyboard input system according to claim 1, wherein the loading code is further configured to cause at least one of the at least one processor to:
delete, from the library, based on the first type being inconsistent with the second type of the previous input keyboard, a system word vocabulary and a conversion algorithm model that have been loaded and that correspond to the second type.

3. The keyboard input system according to claim 1, wherein the first obtaining code is further configured to cause at least one of the at least one processor to:
determining, from the user lexicon, a user entry corresponding to the inputted information and an on-screen frequency of the user entry; and
determining, from the system word vocabulary, a system entry corresponding to the inputted information and a system term frequency of the system entry.

4. The keyboard input system according to claim 3, wherein the output code is further configured to cause at least one of the at least one processor to:
determine candidate scores respectively corresponding to the user entry and the system entry according to the conversion algorithm model, the on-screen frequency of the user entry, and the system term frequency of the system entry; and
determine, according to the candidate scores, the user entry and the system entry that are comprised in the list of to-be-selected entries, and sort information of entries in the list of to-be-selected entries on a screen of the electronic device.

5. The keyboard input system according to claim 1, wherein the first type of the current input keyboard is a physical keyboard or a virtual keyboard.

6. The keyboard input system according to claim 1, wherein the system word vocabulary corresponding to the type of the current input keyboard comprises a system lexicon header area and a system lexicon data area;
the system lexicon header area comprises a system lexicon type, the system lexicon type being configured to describe the first type of the current input keyboard; and
the system lexicon data area comprises a plurality of pieces of system entry data corresponding to a vocabulary of the current input keyboard.

7. The keyboard input system according to claim 1, wherein the conversion algorithm model comprises parameter data models of the current input keyboard that are respectively based on a plurality of sub-algorithms, the plurality of sub-algorithms comprising the following algorithms: a word grouping algorithm, an error correction algorithm, a frequency adjustment algorithm, and a cloud input algorithm.

8. A non-transitory computer-readable storage medium storing computer code which, when executed by at least one processor, causes the at least one processor to at least:
obtain inputted information of a current input keyboard, and determining a first type of the current input keyboard based on the inputted information;
load, based on the first type being inconsistent with a second type of a previous input keyboard used during a previously performed input operation, a system word vocabulary and a conversion algorithm model that correspond to the first type from a library;
obtain user entry information corresponding to the inputted information from a user lexicon that has been loaded, the user lexicon comprising a user entry used based on an input keyboard of any type, and the user lexicon, the system word vocabulary, and the conversion algorithm model being set in a same input method kernel engine;
obtain system entry information corresponding to the inputted information from the system word vocabulary; and
determine a list of to-be-selected entries corresponding to the inputted information according to the user entry information, the system entry information, and the conversion algorithm model, and outputting the list of to-be-selected entries.

9. The non-transitory computer-readable storage medium according to claim 8, wherein the computer code causes the at least one processor to at least:
delete, from the library, based on the first type being inconsistent with the second type of the previous input keyboard, a system word vocabulary and a conversion algorithm model that have been loaded and that correspond to the second type.

10. The non-transitory computer-readable storage medium according to claim 8, wherein the obtain the user entry information and the obtain the system entry information comprises:
determining, from the user lexicon, a user entry corresponding to the inputted information and an on-screen frequency of the user entry; and
determining, from the system word vocabulary, a system entry corresponding to the inputted information and a system term frequency of the system entry.

11. The non-transitory computer-readable storage medium according to claim 10, wherein the determine the list of to-be-selected entries comprises:
determining candidate scores respectively corresponding to the user entry and the system entry according to the conversion algorithm model, the on-screen frequency of the user entry, and the system term frequency of the system entry; and
determining, according to the candidate scores, the user entry and the system entry that are comprised in the list of to-be-selected entries, and sorting information of entries in the list of to-be-selected entries on a screen of the electronic device.

12. The non-transitory computer-readable storage medium according to claim 8, wherein the first type of the current input keyboard is a physical keyboard or a virtual keyboard.

13. The non-transitory computer-readable storage medium according to claim 8, wherein the system word vocabulary corresponding to the type of the current input keyboard comprises a system lexicon header area and a system lexicon data area;
the system lexicon header area comprises a system lexicon type, the system lexicon type being configured to describe the first type of the current input keyboard; and
the system lexicon data area comprises a plurality of pieces of system entry data corresponding to a vocabulary of the current input keyboard.

14. A keyboard input method, performed by an electronic device, comprising:
obtaining inputted information of a current input keyboard, and determining a first type of the current input keyboard based on the inputted information;
loading, based on the first type being inconsistent with a second type of a previous input keyboard used during a previously performed input operation, a system word vocabulary and a conversion algorithm model that correspond to the first type from a library;
obtaining user entry information corresponding to the inputted information from a user lexicon that has been loaded, the user lexicon comprising a user entry used based on an input keyboard of any type, and the user lexicon, the system word vocabulary, and the conversion algorithm model being set in a same input method kernel engine;

obtaining system entry information corresponding to the inputted information from the system word vocabulary; and determining a list of to-be-selected entries corresponding to the inputted information according to the user entry information, the system entry information, and the conversion algorithm model, and outputting the list of to-be-selected entries.

15. The keyboard input method according to claim 14, wherein the method further comprising deleting, from the library, based on the first type being inconsistent with the second type of the previous input keyboard, a system word vocabulary and a conversion algorithm model that have been loaded and that correspond to the second type.

16. The keyboard input method according to claim 14, wherein obtaining the user entry information and obtaining the system entry information comprises:

determining, from the user lexicon, a user entry corresponding to the inputted information and an on-screen frequency of the user entry; and determining, from the system word vocabulary, a system entry corresponding to the inputted information and a system term frequency of the system entry.

17. The keyboard input method according to claim 16, wherein determining the list of to-be-selected entries comprises:

determining candidate scores respectively corresponding to the user entry and the system entry according to the conversion algorithm model, the on-screen frequency of the user entry, and the system term frequency of the system entry; and determining, according to the candidate scores, the user entry and the system entry that are comprised in the list of to-be-selected entries, and sorting information of entries in the list of to-be-selected entries on a screen of the electronic device.

18. The keyboard input method according to claim 14, wherein the first type of the current input keyboard is a physical keyboard or a virtual keyboard.

19. The keyboard input method according to claim 14, wherein the system word vocabulary corresponding to the type of the current input keyboard comprises a system lexicon header area and a system lexicon data area;

the system lexicon header area comprises a system lexicon type, the system lexicon type being configured to describe the first type of the current input keyboard; and the system lexicon data area comprises a plurality of pieces of system entry data corresponding to a vocabulary of the current input keyboard.

20. The keyboard input method according to claim 14, wherein the conversion algorithm model comprises parameter data models of the current input keyboard that are respectively based on a plurality of sub-algorithms, the plurality of sub-algorithms comprising the following algorithms: a word grouping algorithm, an error correction algorithm, a frequency adjustment algorithm, and a cloud input algorithm.

* * * * *